(12) United States Patent
Hokkanen et al.

(10) Patent No.: US 10,635,258 B2
(45) Date of Patent: Apr. 28, 2020

(54) USER INTERFACE AND EARTH-MOVING MACHINE

(71) Applicant: NOVATRON OY, Pirkkala (FI)

(72) Inventors: Visa Hokkanen, Tampere (FI); Mikko Vesanen, Tampere (FI)

(73) Assignee: NOVATRON OY, Pirkkala (FI)

( * ) Notice: Subject to any disclaimer, the term of this patent is extended or adjusted under 35 U.S.C. 154(b) by 298 days.

(21) Appl. No.: 15/608,505

(22) Filed: May 30, 2017

(65) Prior Publication Data

US 2017/0344221 A1 Nov. 30, 2017

(30) Foreign Application Priority Data

May 31, 2016 (FI) ...................................... 20165452

(51) Int. Cl.
| | |
|---|---|
| *G01C 21/00* | (2006.01) |
| *G06F 3/0481* | (2013.01) |
| *G02B 27/01* | (2006.01) |
| *G06F 3/01* | (2006.01) |
| *G06F 1/16* | (2006.01) |
| *E02F 9/26* | (2006.01) |
| *H04N 13/332* | (2018.01) |
| *G06Q 50/08* | (2012.01) |

(52) U.S. Cl.
CPC ............ *G06F 3/04815* (2013.01); *E02F 9/26* (2013.01); *G02B 27/01* (2013.01); *G02B 27/0101* (2013.01); *G06F 1/163* (2013.01); *G06F 3/011* (2013.01); *G06Q 50/08* (2013.01); *H04N 13/332* (2018.05); *G02B 2027/0134* (2013.01)

(58) Field of Classification Search
CPC ...... G06F 3/04815; G06F 1/163; G06F 3/011; G02B 27/01; G02B 27/0101; G02B 2027/0134; E02F 9/26; G06Q 50/08; H04N 13/332
USPC ....... 701/34.4, 36, 50, 408; 341/67; 715/740
See application file for complete search history.

(56) References Cited

U.S. PATENT DOCUMENTS

| | | | | |
|---|---|---|---|---|
| 2005/0080559 | A1* | 4/2005 | Ishibashi | E02F 9/2045 701/50 |
| 2007/0252734 | A1* | 11/2007 | Greiner | E02F 9/26 341/67 |
| 2009/0219199 | A1* | 9/2009 | Borchert | E02F 9/26 342/357.31 |
| 2014/0188333 | A1* | 7/2014 | Friend | E02F 9/261 701/34.4 |

(Continued)

FOREIGN PATENT DOCUMENTS

| | | |
|---|---|---|
| DE | 11 2013 006 256 T5 | 10/2015 |
| JP | 2014129676 A | 7/2014 |

OTHER PUBLICATIONS

European Search Report, Application No. EP17173479, 2 pages, dated Oct. 19, 2017.

(Continued)

*Primary Examiner* — Shardul D Patel
(74) *Attorney, Agent, or Firm* — FisherBroyles, LLP

(57) ABSTRACT

A user interface and an earth-moving machine are described. The user interface includes displaying means and a control unit (CU). The displaying means includes a transparent display unit for displaying virtual earth-moving images. The images are displayed at a virtual image distance from the displaying unit.

31 Claims, 4 Drawing Sheets

(56) References Cited

U.S. PATENT DOCUMENTS

| | | | | |
|---|---|---|---|---|
| 2014/0270380 A1* | 9/2014 | Morin | ...................... | E02F 3/847 |
| | | | | 382/104 |
| 2015/0199106 A1* | 7/2015 | Johnson | .................. | G06F 3/011 |
| | | | | 715/740 |
| 2015/0376868 A1* | 12/2015 | Jackson | ................ | E02F 9/2025 |
| | | | | 701/50 |
| 2016/0004305 A1* | 1/2016 | Pagliani | .................. | G06F 3/013 |
| | | | | 345/633 |
| 2016/0193920 A1* | 7/2016 | Tsubone | .................. | E02F 9/261 |
| | | | | 701/36 |

OTHER PUBLICATIONS

Finnish Search Report, Application No. 20165452, 2 pages, dated Dec. 22, 2016.

* cited by examiner

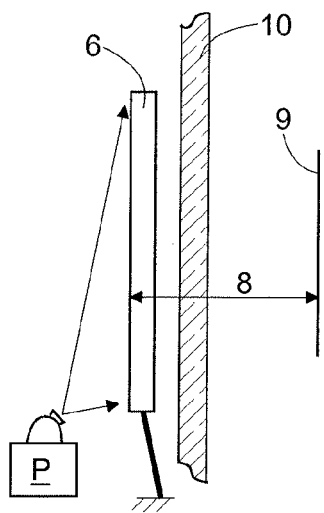
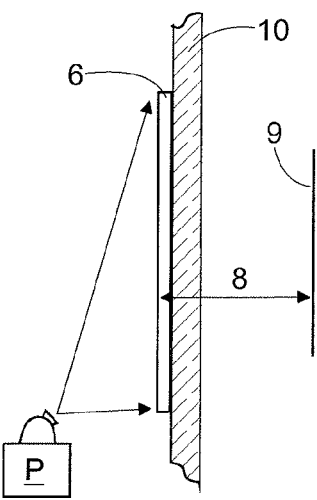
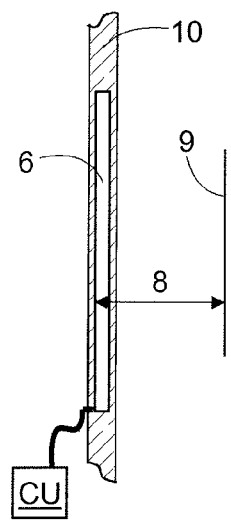
FIG. 7a　　　FIG. 7b　　　FIG. 7c
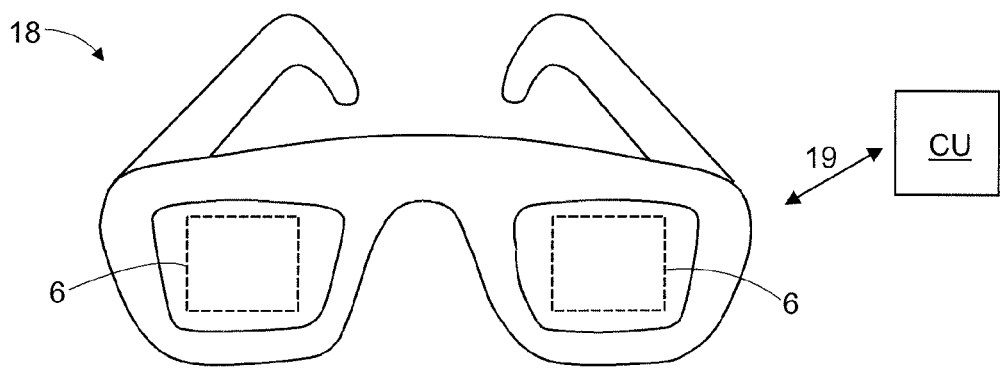
FIG. 8
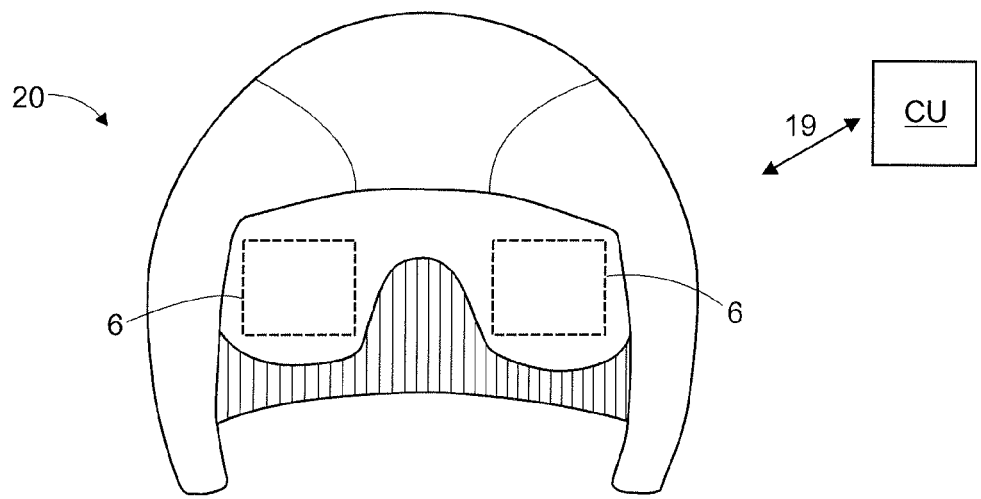
FIG. 9

USER INTERFACE AND EARTH-MOVING MACHINE

CROSS-REFERENCE TO RELATED APPLICATION

This application claims benefit to Finnish Application No. 20165452, filed May 31, 2016, which is incorporated by reference herein in its entirety.

BACKGROUND

Field

The invention relates to a user interface for presenting information for an operator of an earth-moving machine.

Description of the Related Art

The invention further relates to an earth-moving machine.

The field of the invention is defined more specifically in the preambles of the independent claims.

Different types of earth-moving machines may be utilized at different work sites for moving soil or rock material to another location or to process them into a desired shape. The earth-moving machines are used in excavation work and road construction, for example. The earth-moving machines have user interfaces for receiving and processing data and displaying it for an operator. However, the known user interfaces have shown to contain some problems.

SUMMARY

An object of the invention is to provide a novel and improved user interface for an earth-moving machine. Further object is to provide a novel and improved earth-moving machine equipped with a user interface for producing and displaying visual earth-moving data.

The user interface according to the invention is characterized by the features disclosed in characterized portion of the first independent apparatus claim.

The earth-moving machine according to the invention is characterized by the features disclosed in characterized portion of the second independent apparatus claim.

An idea of the disclosed solution is that the user interface is based on head-up display technology wherein an operator of an earth-moving machine is provided with data on a transparent display, which is arranged to a field of view of the operator. On the transparent display selected computer created artificial earth-moving data and images are overlaid on the real world view. Thus, the operator is provided on the display with augmented visual data and information for controlling the earth-moving machine. Further, the system is arranged to display the earth-moving image visually at a depth, so that the earth-moving data or images appear to locate visually at a greater distance from the operator compared to a display surface on which the data or images are projected.

Any competent existing or future technology may be applied to provide the disclosed visual system and visual depth experience for an operator of an earth-moving machine.

An advantage of the disclosed solution is that an operator of an earth-moving machine may stay focused in the current work and is at the same time allowed to see the displayed earth-moving data. Thanks to the disclosed head-up system, less work stress is directed to the operator since better ergonomics may be achieved. Since the virtual earth-moving images are shown at visual depth from the display surface, eyes of the operator may keep their focus to the current operational target and the displayed earth-moving images are still recognized by the operator. Since no repeating focusing of the operators eyes between the operational target and the virtual earth-moving images are needed, less loading is directed to the eyes of the operator. Further, efficiency of the operator and the machine may be improved when the operator is provided with sufficient assisting earth-moving and machine related information. When augmented reality (AR) is brought in natural line of sight of the operator, the work of the operator is made less demanding, whereby even less experienced operators may be engaged.

According to an embodiment, the disclosed user interface system is suitable for any kind of earth-moving machines. Furthermore, the user interface may also be installed to existing machines, whereby their systems may be up-dated. Thus, the disclosed system may also be retrofitted.

According to an embodiment, the adjusting device of the displaying means is adapted to display the virtual earth-moving image to have a visual image distance at least at 2 meters depth from the display surface. A visual image distance at 5 meters depth has in practice found especially suitable. Magnitude of the virtual depth may be dimensioned earth-moving machine specifically, since in different earth-moving machines distance between a control cabin and a boom end or tool is different.

According to an embodiment, the location of the displayed virtual earth-moving image is fixed in a depth direction, whereby stereoscopic effect of the displayed virtual earth-moving image is constant. Advantages of the fixed image distance are easy implementation and that no extra requirements for the system are needed.

According to an embodiment, the location of the displayed virtual earth-moving image is fixed in a depth direction. However, height of the displayed sight or window may change in response to the position data of the monitored object.

According to an embodiment, the control unit of the user interface receives position data of a selected movable object of the earth-moving machine and monitors that object. Further, the control unit controls the adjusting device of the displaying means to change the virtual image distance of the displayed virtual earth-moving image in response to the position data of the monitored object. Thereby, the stereoscopic effect of the displayed virtual earth-moving image is adjusted in accordance with the position of the monitored object. In other words, when the monitored object, such as a bucket, is located close to the control cabin, the virtual depth may be short and when the object is distant the virtual depth is deeper. This way the depth appearance adapts automatically to the current distance of the monitored object. Further, the system may include a pre-determined adjustment range inside which the virtual image distance is adjustable. This way it may be guaranteed that the displayed earth moving images remain always sufficiently large and recognizable.

According to an embodiment, the displaying means of the user interface comprise at least one projector and at least one combiner serving as the transparent display unit. The combiner is located at a first distance from the projector. The combiner is provided with a projection surface for receiving and displaying the virtual earth-moving images projected by means of the projector. Further, the adjusting device controls the projector to display the virtual earth-moving image at a visual depth direction greater than the mentioned first distance.

According to an embodiment, the adjusting device of the displaying means comprises an adjustable optical system for generating stereoscopic effect for the displayed virtual earth-moving image. The optical system may be part of a projector, which projects the earth moving images on the transparent display unit or combiner.

According to an embodiment, the transparent display unit is mounted on an inside surface of a windscreen of an earth-moving machine. Then, a separately formed display unit may be glued or mechanically fastened against an inner surface of the wind screen.

According to an embodiment, the transparent display unit is an inseparable part of a windscreen of an earth-moving machine. Thus, one or more display surfaces may be integrated to be part of the windscreen structure. The display surface may laminated between two layers of the windscreen, or alternatively, the display surface may be a covering arranged on an inner surface of the windscreen, for example.

According to an embodiment, the transparent display unit is a separate component supported inside a control cabin at proximity to a windscreen. Then the windscreen may be of conventional type and the system is easy to retrofit.

According to an embodiment, the user interface comprises wearable displaying means. The user interface may be wearable, or alternatively, only the displaying means are wearable. The wearable displaying means may comprises a head-mounted display (HMD) paired to a headset or helmet. Then, the device can be used a portable head up display providing the operator of the earth-moving machine with near eye augmented reality including images of both the physical world and virtual objects over the field of view of the operator. The system may monitor movement of the operators head and may align virtual information to the physical world on the basis of the head movements. An advantage of this embodiment is that the HMD-device may be utilized also outside the control cabin i.e. in situations when no windshield is between the operator and the visually monitored target. Thus, the operator may step outside the cabin in order to examine the surrounding, operational target or any other point of interest, and may then be assisted by means of the displayed virtual earth-moving images. Further, the use of the portable device is not limited to one single earth-moving machine but may be utilized flexibly for controlling several different machines. The control unit receiving and processing control data may also be portable. Alternatively, the earth-moving machines may comprise on-board control units which communicate with the HMD-devices via data transmission connection, which may be wireless. The HMD-device may comprise a combiner and a projector in a similar manner as the HUD-system arranged in connection with a windscreen of the control cabin. However, any other feasible displaying techniques may also be applied. The wearable systems are also provided with the disclosed feature of displaying earth-moving data three-dimensionally at a visual depth.

According to an embodiment, the displayed visual earth-moving image comprises one or more of the following visual elements: vector graphics, 3D primitive object (such as a triangle, line, point), numeral element, text element, indicator element, alarm signal element, instruction element, graphical icon element. Thus, there is a plurality of alternative ways to provide the operator with assisting information on the display unit. The images may be designed to be clear and intuitive.

According to an embodiment, the earth-moving data comprises at least one earth-moving plan of the earth-moving task executable at a work site of the earth-moving device. Then, the displayed visual earth-moving image illustrates data relating to the earth-moving plan.

According to an embodiment, the earth-moving data comprises at least one selectable execution model of an earth-moving work task executable at a work site of the earth-moving device. Then, the displayed visual earth-moving image illustrates data relating to the execution model. The execution model may comprise position data and work instructions on work targets at the work site. The execution model and the displayed image may comprise position coordinates, direction indicators, level indicators, map drawings, images of existing infrastructure such as pipe lines and electrical cables, for example.

According to an embodiment, the earth-moving data comprises identification data of the executed earth-moving plan or selected execution model. Thus, the displayed visual earth-moving image illustrates the identification data. The identification data may be a code, reference numeral, name or symbol, for example. By means of the displayed identification data the operator is always aware of the presently executed earth-moving plan. Thereby right and adequate measures are executed.

According to an embodiment, the earth-moving data comprises identification data of a classification system. Fixed infrastructure existing at the work site may be classified into several classes according to their properties, intended use and vulnerability, for example. Each class may be provided with a class code and the disclosed system may display the class codes for providing the operator with additional identification data. The class codes may comprise numbers, characters or visual symbols, for example. The classification system may comprise dedicated classes and codes for buildings, roads, bridges, tunnels, energy supply lines, pipe lines, data communication networks and other physical objects and fixed infrastructure.

According to an embodiment, the control unit of the user interface receives position data of the earth-moving machine and an earth-moving tool of the earth-moving machine. The control unit compares the received position data to the earth-moving plan or the selected execution model and generates instruction data for guiding an operator of the earth-moving machine. Thus, the displayed visual earth-moving image illustrates the instruction data. The instruction data may comprise colored arrows indicating for an operator to lift or descend the tool in order to match the planned level. Directional lines or arrows may also be used to instruct the operator of the planned direction and position of planned objects at the works site.

According to an embodiment, the earth-moving data comprises fleet management data relating to earth-moving operations executed at the earth-moving work site. Then the displayed visual earth-moving image illustrates the fleet management data. The fleet management data may comprise supervisory instructions and guidance as well as identification and configuration of an excavation team presently in operation. The fleet management data may further comprise information, which is shared between several individual earth-moving machines belonging to the same team.

According to an embodiment, the earth-moving data comprises communication data relating to earth-moving operations executed at the earth-moving work site. Then the displayed visual earth-moving image illustrates the communication data. The displayed information may comprise text based short messages, for example.

According to an embodiment, the earth-moving data comprises system data relating to operating systems of the earth-moving machine. Then, the displayed visual earth-moving image illustrates the system data. The earth-moving machine may comprises several sensors and measuring devices for monitoring performance, operational condition, service need and other features of motors, actuators, auxiliary systems and devices of the machine. Monitoring data may be displayed by means of the disclosed HUD- and HMD-devices and a view of a real-world environment is augmented by monitoring symbols, images and values.

According to an embodiment, the earth-moving data comprises positioning data relating to the current position of the earth-moving machine at the earth-moving work site. Then the displayed visual earth-moving image illustrates the positioning data. The positioning image may indicate coordinates of the machine, distance and direction to desired objects at the work site and navigation instructions to reach selected work objects and machine positions for executing selected work tasks at the objects.

According to an embodiment, the earth-moving data comprises satellite positioning condition data relating to satellite signal availability at the current position of the earth-moving machine at the earth-moving work site. Then the displayed visual earth-moving image illustrates the satellite positioning condition data. The satellite positioning condition data may indicate bad satellite coverage and may inform the operator when proper satellite coverage is available. The displayed image may also suggest using an alternative positioning system instead of GNSS-positioning, or in addition to.

According to an embodiment, the earth-moving machine is one of the following: excavator, bulldozer, motor grader, compaction machine, piling machine, deep stabilization machine.

According to an embodiment, the disclosed solution is applied in earth-moving solutions comprising civil engineering work executed by means of movable machines provided with suitable work tools, machineries and accessories. The earthmoving comprises road and railroad constructions work as well as all kind of modification and enforcement of soil or ground by means of creating new buildings or infrastructure. Earth-moving machines dedicated for the described work include excavators, bulldozers, motor graders, which are used for shaping the soil. However earth-moving machines may also comprise compaction machines, piling machines and deep stabilization machines, which may be used to stabilize the ground.

The above-disclosed embodiments may be combined to form suitable solutions provided with necessary features disclosed.

BRIEF DESCRIPTION OF THE DRAWINGS

Some embodiments are described in more detail in the accompanying drawings, in which FIGS. 7a-7c are schematic side views of some possible arrangements for displaying earth-moving images on a transparent display unit, FIG. 8 is a schematic front view of a headset provided with one or two head-mounted display units, and FIG. 9 is a schematic front view of a helmet provided with a head-mounted display unit.

For the sake of clarity, the figures show some embodiments of the disclosed solution in a simplified manner. In the figures, like reference numerals identify like elements.

DETAILED DESCRIPTION

Figure 1:
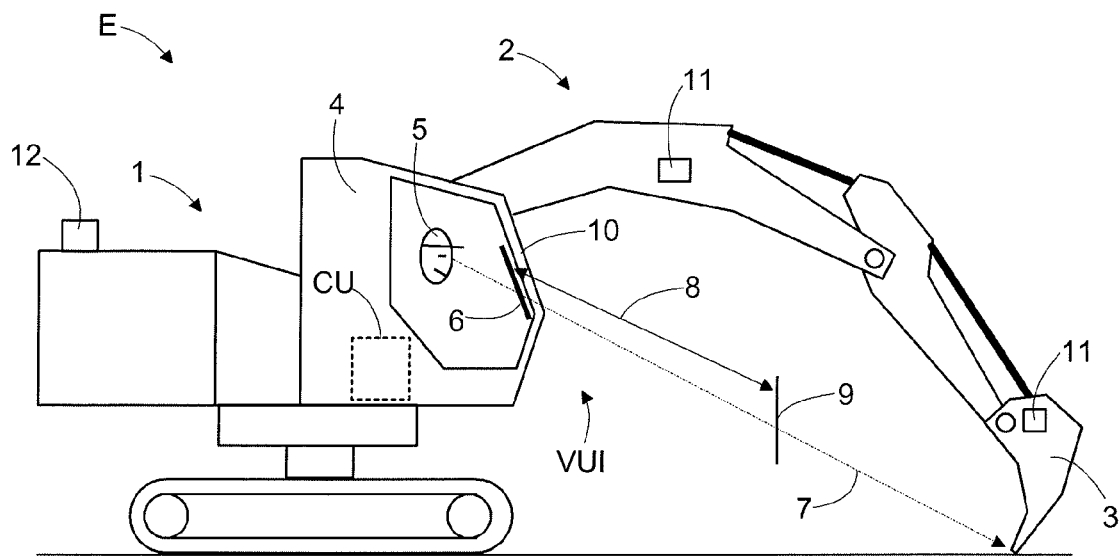
FIG. 1 is a schematic side view of an excavating machine provided with a visual user interface for generating aid for an operator.

FIG. 1 shows an earth-moving machine E, which is in this case an excavator comprising a movable carrier 1 on which a boom 2 is arranged. At a distal end of the boom 2 is a tool 3, in this case a bucket. The boom 2 may be moved in a versatile manner. On the carrier 1 is a control cabin 4 for an operator 5. Inside the cabin 4 is a visual user interface system VUI, which comprises at least one transparent display unit 6 through which the operator 5 may monitor operation of the tool 3. Visual line 7 or sight line between eyes of the operator 5 and the tool 3 is also indicated. As discussed above in this patent application, the system adjusts the displayed images so that they appear to locate at a visual distance 8 from the transparent display unit 6. A visual augmented view 9 at depth position is shown in a simplified manner. Then the operator 5 will experience a three-dimensional visual effect and the displayed images are well shown at visual field of the operator 5 without a need to focus eyes of the operator. The transparent display unit 6 may be a separate device, which is arranged close to a windscreen 10 of the cabin 4. The transparent display unit 6 may be in a data communication with one or more control units CU.

FIG. 1 further discloses that the machine E and its operational components may be equipped with sensors 11 and measuring devices for gathering position data, for example. Moreover, the machine E may comprise one or more navigation or position determining systems 12, such as GNNS positioning systems for determining position and direction of the machine E. The data received from the measuring devices 11 and 12 may have effect on how the earth-moving images are displayed and on the other hand the measuring results may be part of the earth-moving data itself.

Figure 2:
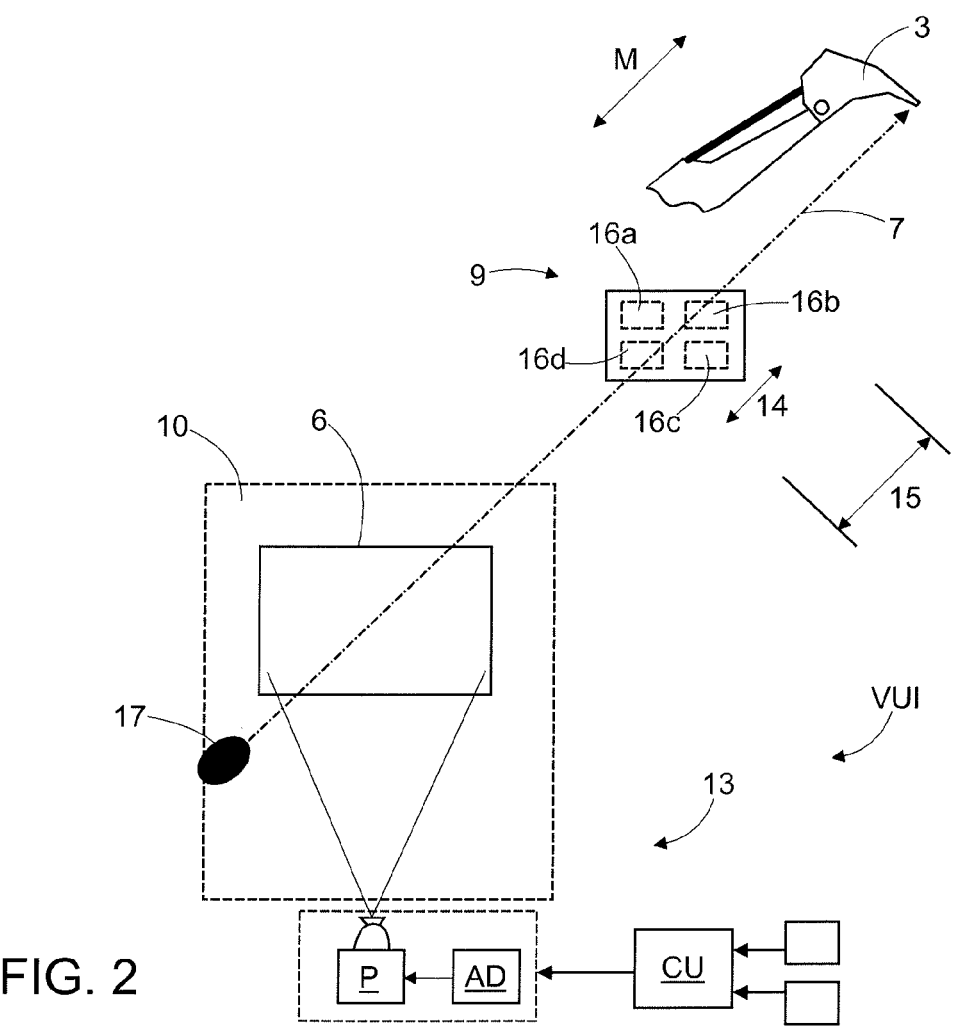
FIG. 2 shows schematically principle of showing earth-moving images at a visual distance from a display surface of a transparent display unit.

FIG. 2 discloses some features of a visual user interface VIU system. The system comprises a control unit CU and displaying means 13. The displaying means 13 comprise a transparent display unit 6 serving as a head-up display system together with a projector P. The displaying unit 6 may be a combiner on which the projector projects the images. The displaying means 13 also comprises an adjusting device AD for adapting the displaying unit 6 to show a view 9 at a visual depth. Depth position of the view 9 may be adjusted 14 in accordance with position and movement M of a tool 3, for example. The depth adjustment 14 may be limited by means of a pre-determined depth range 15. The view 9 may comprise one or more visual elements 16a-16d and each of them may comprise one or more earth-moving images or data objects. In FIG. 2 an eye 17 of the operator is shown in a simplified manner.

Figure 3:
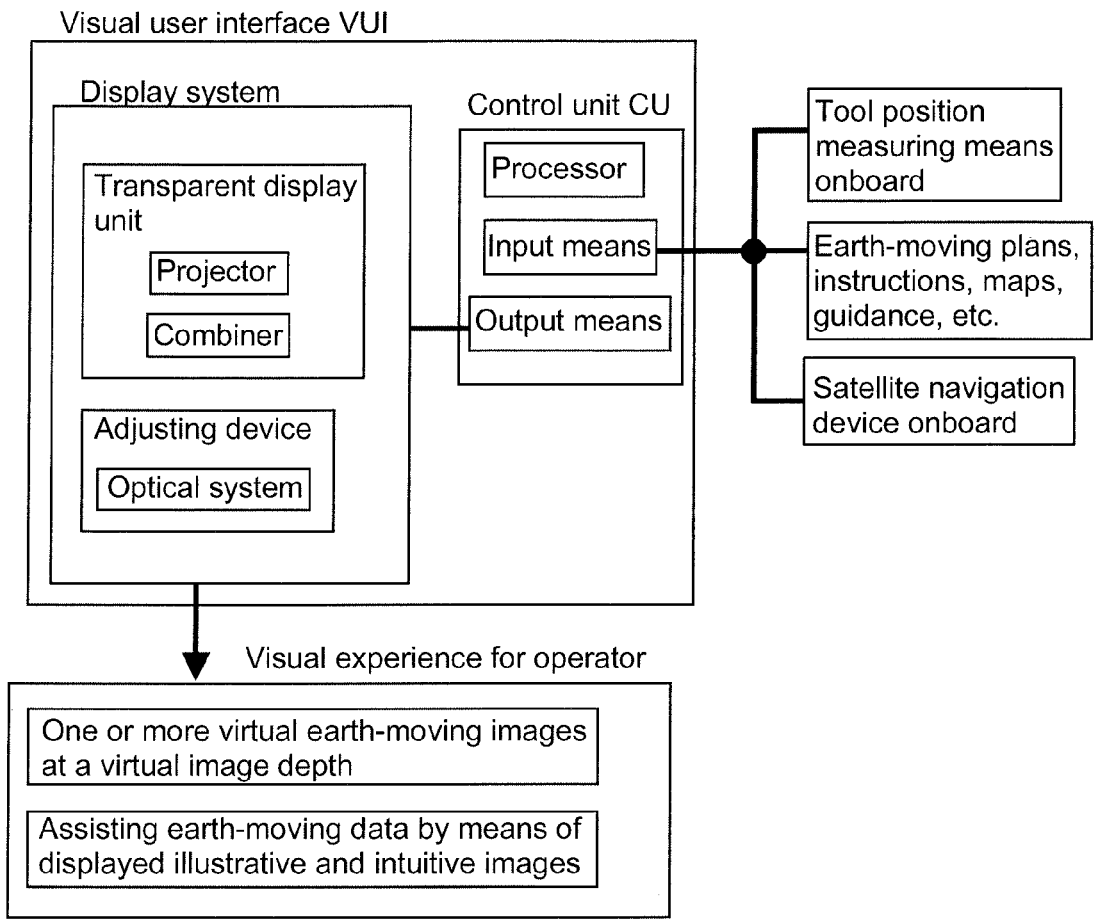
FIG. 3 is a schematic diagram showing components and features of a visual user interface.

FIG. 3 discloses components and features relating to the visual interface which is in accordance with the present patent application. These features and components are already discussed above.

Figure 4:
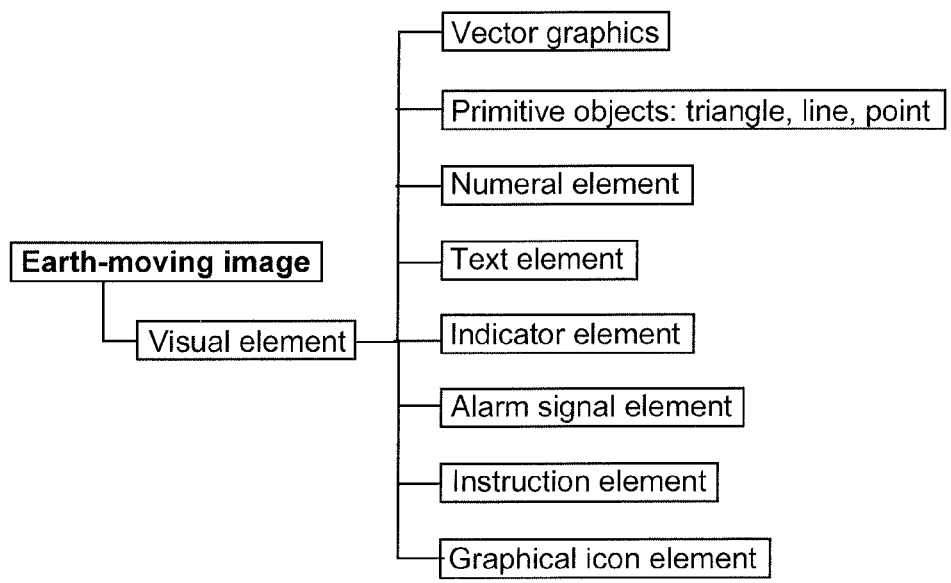
FIG. 4 is a schematic diagram showing some feasible visual elements of displayed earth-moving images.
Figure 5:
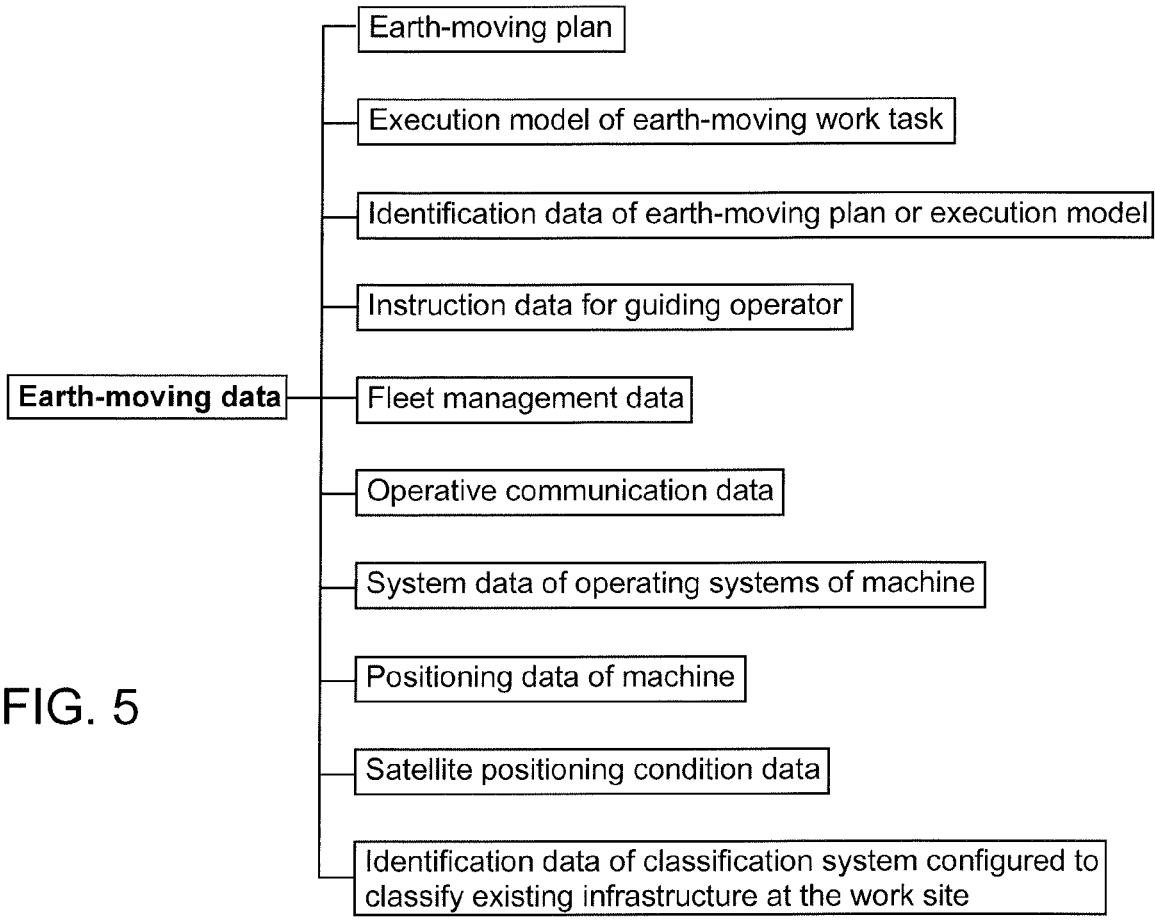
FIG. 5 is a schematic diagram showing some feasible earth-moving data elements and features.
Figure 6:
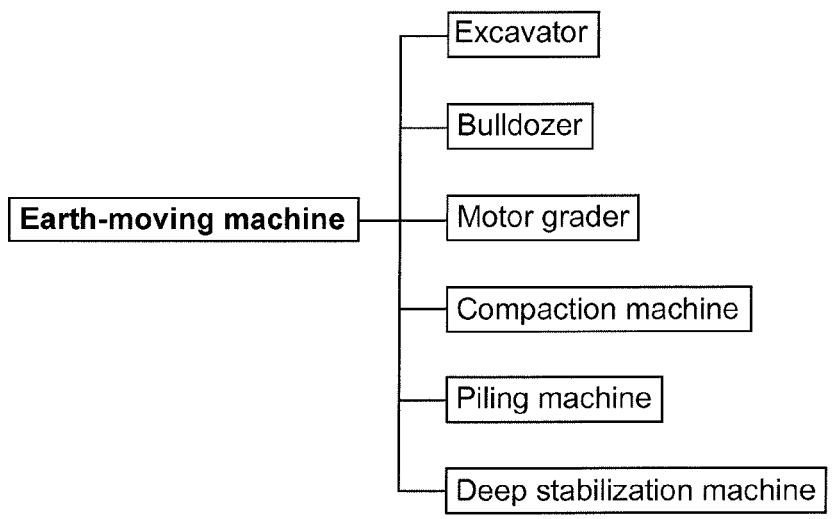
FIG. 6 is a schematic diagram showing some feasible earth-moving machines.

FIGS. 4-6 show feasible features and alternatives, which are already been disclosed above in this patent application.

FIG. 7a discloses a separate transparent displaying unit 6 or combiner arranged at a distance from a windscreen 10. FIG. 7b discloses a solution wherein a combiner 6 is fastened to an inner surface of the windscreen 10. FIG. 7c discloses an integrated solution wherein the transparent displaying unit 6 is located inside a structure of the windscreen 10.

FIG. 8 discloses a headset 18 or media glasses provided with one or more transparent displaying units 6. The headset 18 may communicate with one or more external or internal control units CU through one or more data communication 19. The same applies also for a helmet 20, which is also provided with the transparent displaying units 6. In both arrangements the earth-moving images and data elements may be displayed so that they appear to locate at a visual distance from the transparent displaying units 6, which are located close to eyes of the operator.

The drawings and the related description are only intended to illustrate the idea of the invention. In its details, the invention may vary within the scope of the claims.

The invention claimed is:

1. A user interface of an earth-moving machine, the user interface comprising:
   at least one control unit configured to receive data and process the received data; and
   displaying means for displaying data received from the control unit,
   wherein the displaying means are based on a head-up display system comprising at least one transparent display unit, which is provided with a display surface,
   the control unit provided with earth-moving data and configured to generate at least one virtual earth-moving image, the at least one virtual earth-moving image comprising at least one of: earth-moving plan and selectable execution model of an earth-moving work task executable at a work site of the earth-moving machine,
   the control unit configured to receive position data of the earth-moving machine and an earth-moving tool of the earth-moving machine,
   the control unit configured to compare the received position data to the at least one of: earth-moving plan and selected execution model and configured to generate instruction data for guiding an operator of the earth-moving machine,
   the displaying means provided with an adjusting device adapted to display the at least one virtual earth-moving image three-dimensionally at a virtual image distance fixed in a depth direction from the display surface by means of the transparent display unit, whereby the displayed at least one virtual earth-moving image appears to locate at a constant visual depth compared to the display surface,
   the displaying means configured to display the at least one virtual earth-moving image, wherein the at least one virtual earth-moving image comprises the at least one of: earth-moving plan and the selected execution model with the illustration of the instruction data,
   wherein the illustration of the instruction data comprises the illustration of at least one of: the earth-moving tool and the earth-moving machine.

2. The user interface as claimed in claim 1, wherein the adjusting device is adapted to display the virtual earth-moving image to have a virtual image distance at least at 2 meters depth from the display surface.

3. The user interface as claimed in claim 1, wherein the control unit is configured to receive position data of a selected movable object of the earth-moving machine and is configured to monitor the selected movable object,
   the control unit configured to control the adjusting device to change the virtual image distance of the displayed virtual earth-moving image in response to the position data of the monitored object, whereby the stereoscopic effect of the displayed virtual earth-moving image is adjusted in accordance with the position of the monitored object.

4. The user interface as claimed in claim 1, wherein the displaying means comprise at least one projector and at least one combiner serving as the transparent display unit and being located at a first distance from the projector,
   the combiner provided with a projection surface for receiving and displaying the virtual earth-moving images projected by means of the projector,
   the adjusting device configured to control the projector to display the virtual earth-moving image at a virtual depth direction greater than the mentioned first distance.

5. The user interface as claimed in claim 1, wherein the adjusting device comprises an adjustable optical system for generating stereoscopic effect for the displayed virtual earth-moving image.

6. The user interface as claimed in claim 1, wherein the transparent display unit is mounted on an inside surface of a windscreen of an earth-moving machine.

7. The user interface as claimed in claim 1, wherein the transparent display unit is an inseparable part of a windscreen of an earth-moving machine.

8. The user interface as claimed in claim 1, wherein the displayed visual earth-moving image comprises at least one of the following visual elements: vector graphics, 3D primitive object, numeral element, text element, indicator element, alarm signal element, instruction element, graphical icon element.

9. The user interface as claimed in claim 1, wherein the displayed visual earth-moving image comprises at least one 3D primitive object as a visual element.

10. The user interface as claimed in claim 1, wherein the earth-moving data comprises identification data of the at least one of earth-moving plan and selectable execution model,
    the displayed visual earth-moving image illustrating identification data.

11. The user interface as claimed in claim 1, wherein the earth-moving data comprises fleet management data relating to earth-moving operations executed at the earth-moving work site,
    the displayed visual earth-moving image illustrating the fleet management data.

12. The user interface as claimed in claim 1, wherein the earth-moving data comprises communication data relating to earth-moving operations executed at the earth-moving work site,
    the displayed visual earth-moving image illustrating the communication data.

13. The user interface as claimed in claim 1, wherein the earth-moving data comprises system data relating to operating systems of the earth-moving machine, the displayed visual earth-moving image illustrating the system data.

14. The user interface as claimed in claim 1, wherein the earth-moving data comprises positioning data relating to the current position of the earth-moving machine at the earth-moving work site,
the displayed visual earth-moving image illustrating the positioning data.

15. The user interface as claimed in claim 1, wherein the earth-moving data comprises satellite positioning condition data relating to satellite signal availability at the current position of the earth-moving machine at the earth-moving work site,
the displayed visual earth-moving image illustrating the satellite positioning condition data.

16. An earth-moving machine, the machine comprising:
a movable carrier;
at least one earth-moving tool;
actuating means for moving the earth-moving tool in relation to the carrier;
a control system for controlling the operation of the earth-moving machine; comprising sensing means for providing the system with position data of the earth-moving tool and the carrier, wherein the control system comprises a user interface for interaction between an operator and the control system, wherein the user interface is configured to enable displaying augmented reality relating to earth-moving data by means of a head-up display system, the user interface comprising:
at least one control unit configured to receive data and process the received data; and
displaying means for displaying data received from the control unit,
wherein the displaying means are based on a head-up display system comprising at least one transparent display unit, which is provided with a display surface,
the control unit provided with earth-moving data and configured to generate at least one virtual earth-moving image, the at least one virtual earth-moving image comprising at least one of: earth-moving plan and selectable execution model of an earth-moving work task executable at a work site of the earth-moving machine,
the control unit configured to receive position data of the earth-moving machine and an earth-moving tool of the earth-moving machine,
the control unit configured to compare the received position data to the at least one of: earth-moving plan and selected execution model and configured to generate instruction data for guiding an operator of the earth-moving machine,
the displaying means provided with an adjusting device adapted to display the at least one virtual earth-moving image three-dimensionally at a virtual image distance fixed in a depth direction from the display surface, whereby the displayed at least one virtual earth-moving image appears to locate at a constant visual depth compared to the display surface,
the displaying means configured to display the at least one virtual earth-moving image, wherein the at least one virtual earth-moving image comprises the at least one of: earth-moving plan and the selected execution model with the illustration of the instruction data,
wherein the illustration of the instruction data comprises the illustration of at least one of: the earth-moving tool and the earth-moving machine.

17. The earth-moving machine as claimed in claim 16, wherein the earth-moving machine is one of the following: excavator, bulldozer, motor grader, compaction machine, piling machine, deep stabilization machine.

18. The earth-moving machine as claimed in claim 16, wherein the adjusting device is adapted to display the virtual earth-moving image to have a virtual image distance at least at 2 meters depth from the display surface.

19. The earth-moving machine as claimed in claim 16, wherein the control unit is configured to receive position data of a selected movable object of the earth-moving machine and is configured to monitor the selected movable object,
the control unit configured to control the adjusting device to change the virtual image distance of the displayed virtual earth-moving image in response to the position data of the monitored object, whereby the stereoscopic effect of the displayed virtual earth-moving image is adjusted in accordance with the position of the monitored object.

20. The earth-moving machine as claimed in claim 16, wherein the displaying means comprise at least one projector and at least one combiner serving as the transparent display unit and being located at a first distance from the projector,
the combiner provided with a projection surface for receiving and displaying the virtual earth-moving images projected by means of the projector,
the adjusting device configured to control the projector to display the virtual earth-moving image at a virtual depth direction greater than the mentioned first distance.

21. The earth-moving machine as claimed in claim 16, wherein the adjusting device comprises an adjustable optical system for generating stereoscopic effect for the displayed virtual earth-moving image.

22. The earth-moving machine as claimed in claim 16, wherein the transparent display unit is mounted on an inside surface of a windscreen of an earth-moving machine.

23. The earth-moving machine as claimed in claim 16, wherein the transparent display unit is an inseparable part of a windscreen of an earth-moving machine.

24. The earth-moving machine as claimed in claim 16, wherein the displayed visual earth-moving image comprises at least one of the following visual elements: vector graphics, 3D primitive object, numeral element, text element, indicator element, alarm signal element, instruction element, graphical icon element.

25. The earth-moving machine as claimed in claim 16, wherein the displayed visual earth-moving image comprises at least one 3D primitive object as a visual element.

26. The earth-moving machine as claimed in claim 16, wherein the earth-moving data comprises identification data of the at least one of earth-moving plan and selectable execution model,
the displayed visual earth-moving image illustrating identification data.

27. The earth-moving machine as claimed in claim 16, wherein the earth-moving data comprises fleet management data relating to earth-moving operations executed at the earth-moving work site,
the displayed visual earth-moving image illustrating the fleet management data.

28. The earth-moving machine as claimed in claim 16, wherein the earth-moving data comprises communication data relating to earth-moving operations executed at the earth-moving work site, the displayed visual earth-moving image illustrating the communication data.

29. The earth-moving machine as claimed in claim 16, wherein the earth-moving data comprises system data relating to operating systems of the earth-moving machine,
the displayed visual earth-moving image illustrating the system data.

30. The earth-moving machine as claimed in claim 16, wherein the earth-moving data comprises positioning data relating to the current position of the earth-moving machine at the earth-moving work site,
the displayed visual earth-moving image illustrating the positioning data.

31. The earth-moving machine as claimed in claim 16, wherein the earth-moving data comprises satellite positioning condition data relating to satellite signal availability at the current position of the earth-moving machine at the earth-moving work site, the displayed visual earth-moving image illustrating the satellite positioning condition data.

\* \* \* \* \*